(12) United States Patent
Yoon et al.

(10) Patent No.: US 8,117,316 B2
(45) Date of Patent: Feb. 14, 2012

(54) TERMINAL SHIFT MANAGEMENT SYSTEM AND METHOD THEREOF

(75) Inventors: Sung-hyun Yoon, Daejeon (KR); Soon-seok Lee, Daejeon (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 345 days.

(21) Appl. No.: 12/137,932

(22) Filed: Jun. 12, 2008

(65) Prior Publication Data

US 2009/0132635 A1 May 21, 2009

(30) Foreign Application Priority Data

Nov. 15, 2007 (KR) .......................... 10-2007-0116898

(51) Int. Cl.
*G06F 15/16* (2006.01)
*G06F 7/04* (2006.01)
*G06F 17/30* (2006.01)
*H04L 29/06* (2006.01)

(52) U.S. Cl. .............................. 709/227; 709/229; 726/4
(58) Field of Classification Search .................. None
See application file for complete search history.

(56) References Cited

U.S. PATENT DOCUMENTS

| 2002/0169967 | A1* | 11/2002 | Varma et al. | 713/185 |
| 2005/0033843 | A1* | 2/2005 | Shahi et al. | 709/226 |
| 2008/0032695 | A1* | 2/2008 | Zhu et al. | 455/442 |

FOREIGN PATENT DOCUMENTS

| KP | 1020070058295 | | 6/2007 |
| KR | 1020050039070 | A | 4/2005 |
| KR | 1020050053083 | A | 6/2005 |
| KR | 10-2006-0099147 | | 9/2006 |
| KR | 10-0640490 | | 10/2006 |
| KR | 1020070061045 | A | 6/2007 |
| KR | 10-0765368 | | 10/2007 |

\* cited by examiner

*Primary Examiner* — Krista Zele
*Assistant Examiner* — Azizul Choudhury
(74) *Attorney, Agent, or Firm* — Nelson Mullins Riley & Scarborough LLP; EuiHoon Lee, Esq.

(57) ABSTRACT

The present invention relates to a terminal control system, and more particularly, to a system and a method which allows a user to shift an IP service from a terminal to which the service is currently provided to a user's other terminal, thereby enabling the user to continuously using the IP service without disconnection. The system comprises: an authentication authorization accounting (AAA) interface unit which receives unique information having fixed properties with respect to a terminal authenticated by a subscriber terminal authentication system and a user of the authenticated terminal; a terminal interface unit which receives status information having variable properties with respect to the authorized terminal and a currently used service; a unique information managing unit which stores and manages the unique information; a status information managing unit which stores and manages the status information; and a terminal shift management control unit which provides information regarding terminals available for the current service with reference to the unique information and the status information, when there is a terminal shift request, generates service session information which is required when the currently used service is sent to a terminal selected from the information and sends the generated service session information to the selected terminal to which the service is to be shifted. Accordingly, the user of the terminal can conveniently change the terminal to continuously use the IP service without disconnection while using the IP service.

13 Claims, 6 Drawing Sheets

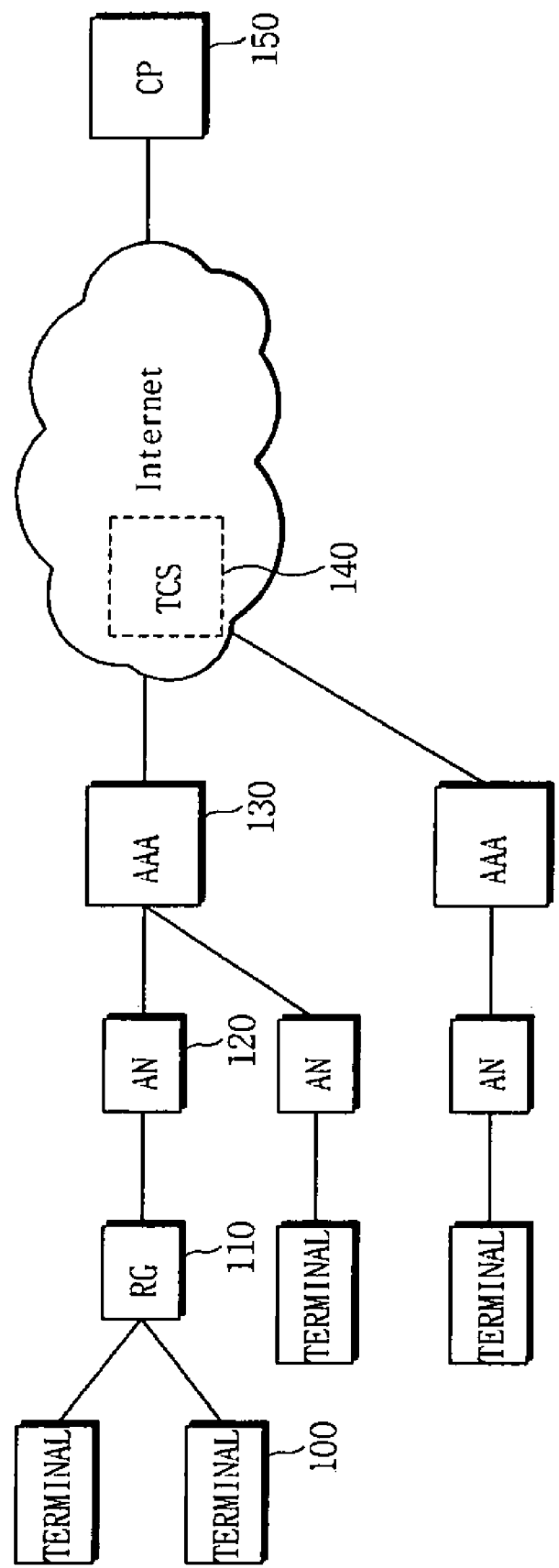

TERMINAL SHIFT MANAGEMENT SYSTEM AND METHOD THEREOF

CROSS REFERENCE TO RELATED APPLICATIONS

This application claims priority from Korean Patent Application No. 10-2007-0116898, filed on Nov. 15, 2007, the disclosure of which is incorporated herein in its entirety by reference.

BACKGROUND OF THE INVENTION

1. Field of the Invention

The present invention relates to a terminal control system, and more particularly, to a method and a system which allows a user to shift an IP service from a terminal to which the service is currently provided to a user's other terminal, thereby enabling the user to continuously using the IP service without disconnection.

This work was partly supported by the IT R&D program of Ministry of Information and Communication (MIC)/Institute for Information Technology Advancement (IITA) [2006-S-064-02, BcN Network Engineering].

2. Description of the Related Art

In general, terminals using an Internet protocol (IP) service are terminals which can use an Internet service, for example, a personal computer, a personal digital assistant, a lap top computer, a mobile phone, an Internet protocol television (IPTV), and a set top box. These terminals provide users with IP services by using their own functions suitable for corresponding services. It tends to merge or combine functions of different terminals to produce a multifunctional terminal. For example, the multi-functional terminals include a laptop computer which enables a user to enjoy various IP services such as video on demand (VOD) and IPTV, and a mobile phone capable of Internet browsing.

However, even the multi-functional terminals that provide various functions have primary functions and secondary functions. For example, a terminal suitable for a voice-based service is preferably compact and light, like a mobile phone, so that a user can easily carry it, and a terminal suitable for a video service requires a large screen and high performance speakers in consideration of visual effects and sound effects. The satisfaction of the user is proportional to how much a function of the terminal is specialized for the service, and thus the user tends to want a specialized terminal for a particular service, with a better performance than that of a secondary function of a multifunctional terminal. For example, if a user uses an IP service with a mobile phone while on the move, the user might want to keep using the IP service by changing a terminal from the mobile phone to a television with a bigger screen and a clear image quality when there is the television the user can use.

As mentioned above, when a user wants to keep using the same service through a different terminal, conventionally, the current used service is stopped and then the user is required to access to the same service using the new terminal. However, in such the method, a different service session needs to be generated for the newly started service, and thus the continuation of the service is not guaranteed. That is, the conventional method has no difference from a method in which individual terminals use the IP service independently.

SUMMARY OF THE INVENTION

The present invention provides a terminal shift management system which allows a user to keep using a currently used IP service with a different terminal that the user owns without disconnection, and which can provides a service that is not subordinate to a terminal by only adjusting an operation system or firmware of the terminal.

The present invention further provides a method of using a terminal shift management service which allows a user to continuously use a currently used IP service with a different terminal without disconnection.

Additional aspects of the invention will be set forth in the description which follows, and in part will be apparent from the description, or may be learned by practice of the invention.

The present invention discloses a terminal shift management system comprising: an authentication authorization accounting (AAA) interface unit which receives unique information having fixed properties with respect to a terminal authenticated by a subscriber terminal authentication system and a user of the authenticated terminal; a terminal interface unit which receives status information having variable properties with respect to the authorized terminal and a currently used service; a unique information managing unit which stores and manages the unique information; a status information managing unit which stores and manages the status information; and a terminal shift management control unit which provides information regarding terminals available for the current service with reference to the unique information and the status information, when there is a terminal shift request, generates service session information which is required when the currently used service is sent to a terminal selected from the information and sends the generated service session information to the selected terminal to which the service is to be shifted.

The present invention also discloses a terminal shift management system comprising: an AAA interface unit which receives unique information of terminals authenticated by a subscriber terminal authentication system, unique information of a user of the authenticated terminals, and unique information of terminals that the user has registered; a terminal interface unit which receives current terminal status information and service status information from the authenticated terminals; a unique information managing unit which stores and manages the unique information; a status information managing unit which stores and manages the status information; a terminal shift management control unit which provides information regarding terminals available for the currently used service with reference to the unique information, when there is a terminal shift request from a terminal that is currently using the service, and receives information regarding a terminal to which the service is to be shifted; and a service proxy module which requests a contents provider to send service data that is currently used by the terminal that has issued the terminal shift request, receives the service data in response and processes the service data in accordance with specifications of the terminal to which the service is to be shifted.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

FIG. 1 is a diagram showing a configuration of a network including a terminal shift management system according to an embodiment of the present invention.

DETAILED DESCRIPTION OF EXEMPLARY EMBODIMENTS

The invention is described more fully hereinafter with reference to the accompanying drawings, in which exemplary embodiments of the invention are shown. Hereinafter, in describing the present invention, detailed descriptions of relevant functions or structures well-known to those skilled in the art will be omitted when it is considered that the descriptions obscure the point of the present invention. For reference, in FIG. 1, RG denotes a residential gateway, and AN denotes an access node.

Figure 2A:
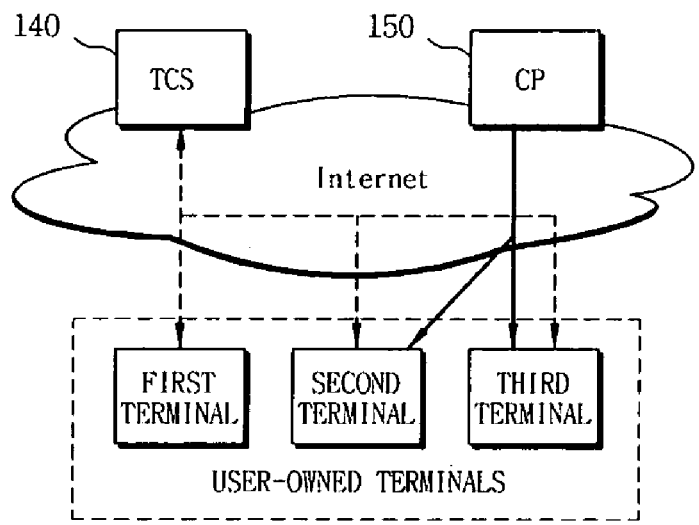
FIGS. 2A and 2B are diagrams for explaining a concept of how to shift a service from one terminal to a different terminal while a user is using the service, according to an embodiment of the present invention.
Figure 2B:
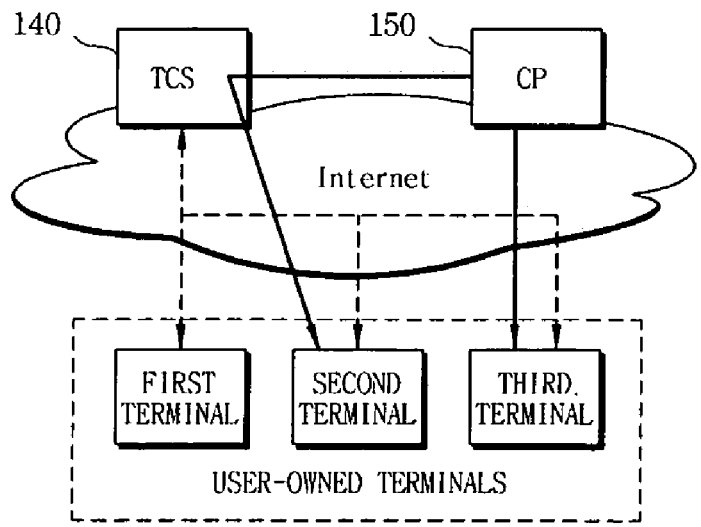

FIG. 1 is a diagram showing a configuration of a network including a terminal shift management system 140 according to an embodiment of the present invention. FIGS. 2A and 2B are diagrams for explaining a concept of how to shift a service from one terminal to a different terminal while a user is using a service, according to an embodiment of the present invention.

As shown in FIG. 1, the terminal shift management system 140 may be called, specifically, a terminal control server (TCS) in terms of controlling the changes in terminals. For convenience of explanation, the terminal shift management system 140 will now be referred to as TCS 140.

Referring to FIG. 1, generally, the user can use Internet protocol (IP) services through terminals using IP. A connection type of each terminal depends on its network interface type and a network configuration status of each of network service providers. For example, a wired terminal may be connected through a RG 110 that is a home appliance or connected directly to an AN 120, and a wireless terminal may be connected to the AN 120 through an air interface. A terminal connected to the AN 120 undergoes an authentication process in an authentication authorization accounting (AAA) 130, and the authentication process proceeds according to a unique method defined by each network service provider. Since the authentication process typically includes terminal authentication, network authentication, and user authentication, the AAA 130 defines an access procedure according to unique information regarding the user's profile, a history of services that the user has subscribed, unique information of the terminal that the user is using, and line information, and the user authentication information and the terminal information that the user is using are sent to the AAA 130 in the course of authentication. The terminal which has undergone the authentication process properly can use the IP service, and can be provided with a unique IP address from a contents provider (CP) 150 according to the service that the user has subscribed.

Most fixed property information from among information about items to be managed by the TCS 140 can be obtained through the AAA 130, and the TCS 140 may be preferably located at the rear of the AAA 130 or placed together with the AAA 130 since the IP service is provided to the terminal, which provides variable property information, after the authentication process is on the terminal.

The TCS 140 receives unique information, which contains containing fixed properties of the authenticated terminal and the user of the terminal, from the AAA 130, and status information, which contains variable properties of the authenticated terminal and the service that the user is using, from the terminal, and provides a terminal shift management service according to the unique information and the status information.

For reference, the TCS 140 manages pieces of information which are classified into information having fixed properties and information having variable properties according to variability in use of the IP services. The information having fixed properties may be general information of the user and information about the subscribed service. Generally, such the information is already possessed by a service provider, and is utilized for the AAA 130 or the like. Meanwhile, the information having variable properties may be information regarding the terminal or service session information, which changes according to the use of the service. Unique information that has fixed properties can be obtained through the AAA 130 which is a subscriber terminal authentication system, and the information having variable properties can be obtained from each terminal.

The 'terminal shift management service' can be defined as a service that enables an IP service which is used by a first terminal to be shifted to a second terminal. The terminal shift management service may be classified into two types, which will now be described with reference to FIGS. 2A and 2B. Referring to FIG. 2A, the TCS 140 obtains unique information and status information of each of a first, a second and a third terminals, which are registered by a user through an IP network, and retains the information. When the user requests to shift use of the IP service from the third terminal to the second terminal, the TCS 140 controls the second terminal to issue a service request to the CP 150 by utilizing the service status information which has been obtained from the third terminal. Then the CP 150 provides the second terminal with a service to which a corresponding service session is applied, and stops the service to the third terminal. As the result, the terminal shift management service by the TCS 140 is terminated, and in view of the service flow from the CP 150, it can be understood that the service shift is realized.

As a modification of the current embodiment of the present invention, a terminal shift management service can be provided using a proxy module. Referring to FIG. 2B, the TCS 140 requests the CP 150 to send service data when there is a terminal shift request from a user after the user registers a service and information of the terminal the user is using through an IP network. Then the TCS 140 receives the requested service data, processes the data in accordance with the specification of a terminal which is requested to be provided with the service, that is, the second terminal in FIG. 2B, and then sends the processed data to the corresponding terminal.

A configuration and operations of the system for implementing a terminal shift management service will now be described with reference to appended drawings.

Figure 3:
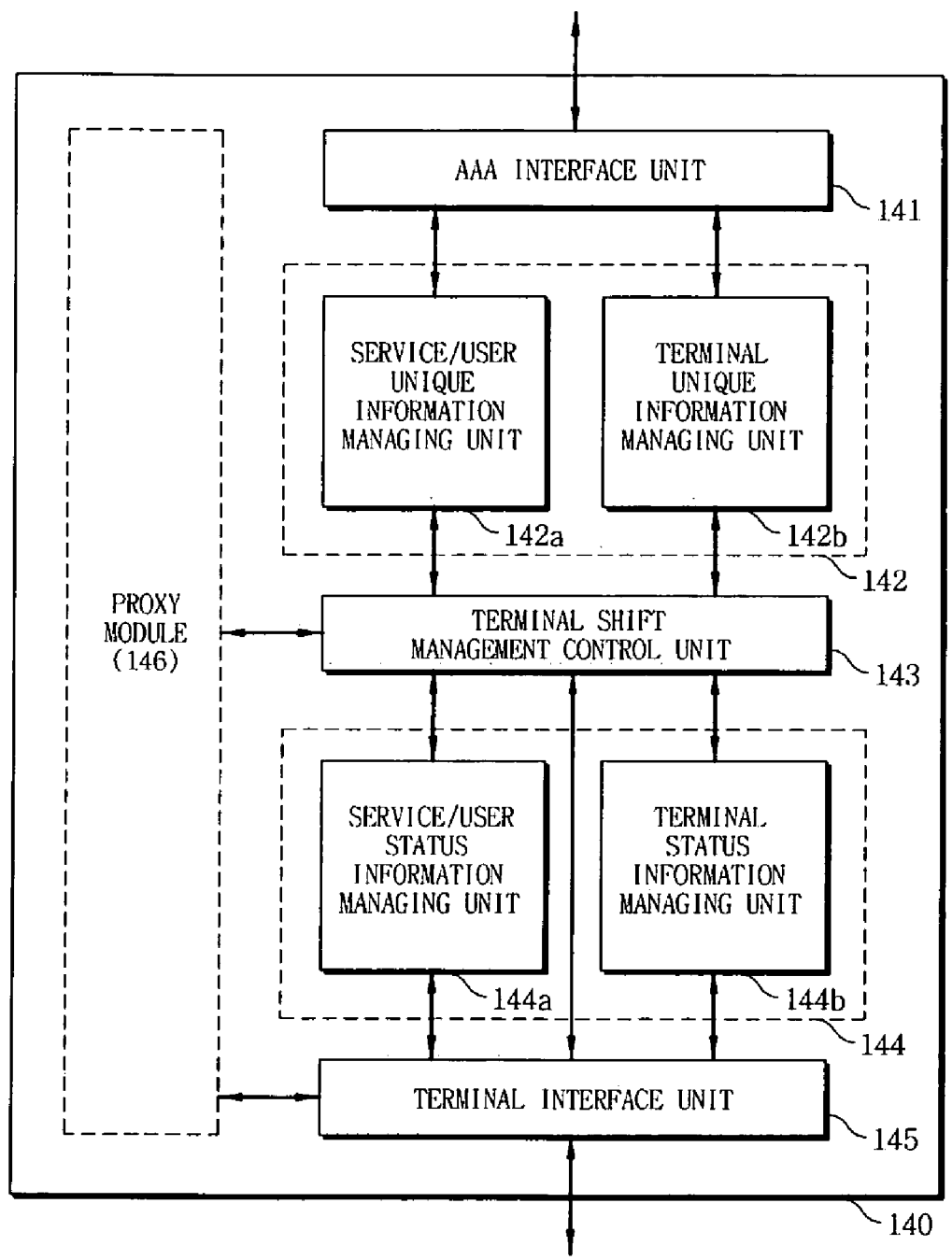
FIG. 3 is a configuration diagram of the terminal shift management system in FIG. 1.

FIG. 3 is a configuration diagram of the TCS 140 in FIG. 1. The TCS 140 includes an AAA interface unit 141 which receives unique information having fixed properties with respect to the terminal authorized by the AAA 130 and the user of the terminal, and a unique information managing unit 142 which stores and manages the unique information received from the AAA interface u nit 141.

The unique information having fixed properties can be classified into terminal unique information and service and user unique information. The terminal unique information includes general information of the terminal, such as, a terminal identification, a terminal name, a terminal serial number, a model of the terminal, and a shape of the terminal, and information of terminal's function, such as built-in protocol list, NIC maximum access speed, supportable bandwidth, CPU performance, an operating system version, compatible codec, and remote control capability. The terminal unique information is managed by a terminal unique information managing unit 142B. The terminal unique information managing unit 142B enables a terminal shift management control unit 143 which will be described later to recognize what service can be provided to a corresponding terminal.

The 'service and user unique information' includes user personal information (for example, identification, contact numbers, subscribed services, bills and the like), general information relating the services (that is, service feature information) and information of user's terminal (a list of owned terminals). Such the service and user unique information is stored and managed by a service/user unique information managing unit 142A. The service/user unique information managing unit 142A infers connection between pieces of information, thereby obtaining a user's taste in services, a pattern of use, and service preference of the user. Thus, the terminal shift management control unit 143, which will be described later, can learn through the service/user unique information managing unit 142A what service the user has subscribed to, kinds and features of the services that are provided to the user, what types of valid terminals the user owns, and the service preference of the user.

Furthermore, the TCS 140 mainly includes a terminal interface unit 145, which receives status information having variable properties with respect to an authorized terminal and the currently used service from the authorized terminal, and a status information managing unit 144, which stores and manages the pieces of status information received from the terminal interface unit 145. The status information managing unit 144 can be divided into a service/user status information managing unit 144A and a terminal status information managing unit 144B.

More specifically, the service/user status information managing unit 144A manages the status information, such as user's location information (obtained by a location based service (LBS), a global positioning system (GPS), or a self-sensor) and service session information, which varies according to the status of use of the service. Also, the service/user status information managing unit 144A performs reset or synchronization on the currently used service, thereby managing the status of the current service. By the service/user status information managing unit 144A, the terminal shift management control unit 143 can recognizes what service can be provided to the terminal based on the current location of the user, the status of the currently used service, and if the shift in the terminals is available for the currently used service.

The terminal status information managing unit 144B manages the status information of each terminal that the user has registered. The status information of various terminals registered by the user includes pieces of variable information such as an access network, access port information, a terminal address, terminal source availability which varies according to use of the service. The variable information is periodically obtained from a corresponding terminal and updated.

Additionally, the TCS 140 includes the terminal shift management control unit 143 which primarily controls the terminal shift service. For example, when a terminal that is using a service requests the TCS 143 to shift the service to different terminal, the terminal shift management unit 143 refers to the unique information and status information of the user and the service and provides the requested terminal with information of terminals available for the service based on the information, and generates service session information and sends it to a selected terminal that the service is to be provided to. Moreover, the terminal shift management control unit 143 may implement a terminal shift service through remote operation or remote control for the requested terminal.

A terminal shift management system can be implemented by only the elements described above, and also a modified system can be implemented by adding a proxy module 146 to the current embodiment. The modified terminal shift management system includes an AAA interface 141 which receives the unique information of a terminal authorized by the AAA, a unique information of the user, and the unique information of the terminal that the user has registered, the terminal interface unit 145 which receives the current status information of the authorized terminal and the status information of the service, the unique information managing unit 142 which stores and manages the pieces of unique information, the status information managing unit 144 which stores and manages the pieces of status information, the terminal shift management control unit 143 which provides a terminal with information of terminal that are available for the current service to be shifted to by referring to the unique information and receives a result of choosing the terminal to which the current service will be provided when the terminal that is using the current service, and the service proxy module 146 which requests the contents provider server to send the service that the requested terminal is using, receives service data in response, and processes the service data in accordance with the specification of the terminal to be provided with the service and sends the processed service data to the terminal.

For further information, the proxy module 146 acts as a buffer between the terminal that requests the shift of the service and the terminal to which the service is shifted.

The initial operation of the terminal 100 will now be described with reference to FIG. 4 before the operation of the TCS 140 is explained.

Figure 4:
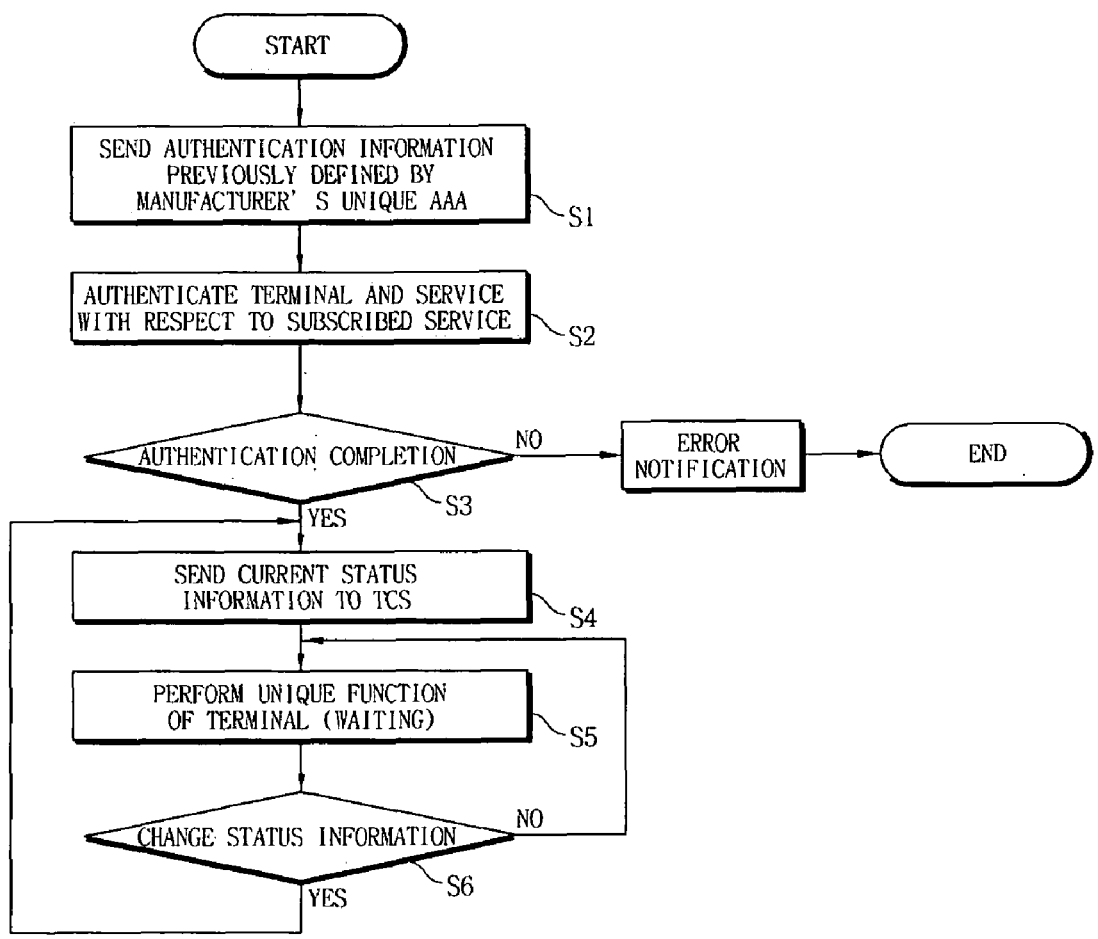
FIG. 4 is a flowchart illustrating the initial operation of the terminal 100 according to an embodiment of the present invention.

FIG. 4 is a flowchart illustrating the initial operation of the terminal 100 according to an embodiment of the present invention.

Referring to FIG. 4, when the terminal 100 is turned on, the terminal 100 sends authentication information to the AAA 130 for the authentication process (operation S1), and the AAA 130 of the manufacture processes the authentication for the terminal 100 and an IP service based on the authentication information sent from the terminal 100 (operation S2), and notifies the terminal 100 of the completion of authentication. Once the authentication is verified (operation S3), the user terminal 100 is authorized to use the IP service. Such the procedures are defined by unique authentication processes of the manufacture.

The terminal 100 which is informed of authentication completion from the AAA 130 sends information about the current status of the terminal 100, including an address, network information and service usage information, to the TCS 140 (operation S4). The TCS 140 stores and manages pieces of status information received from individual terminals 100 in the information managing unit 144, thereby capable of learning the current status of the corresponding terminal 100.

Figure 5:
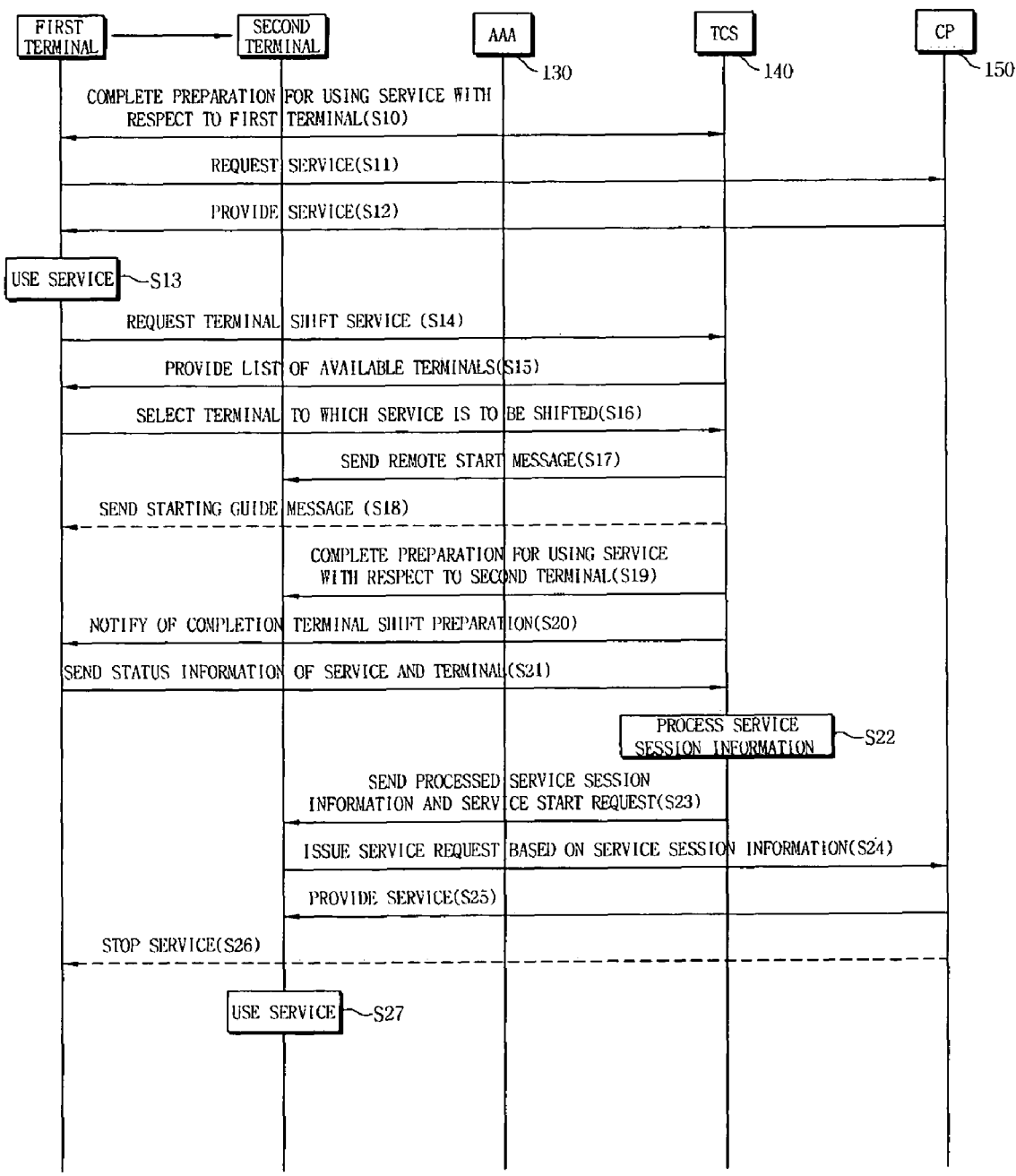
FIG. 5 is a flowchart illustrating how a terminal shift management service is provided according to an embodiment of the present invention.

FIG. 5 is a flowchart illustrating how a terminal shift management service is provided according to an embodiment of the present invention.

Referring to FIG. 5, a plurality of terminals are required since the IP service is used through the terminals. When a first terminal is turned on, the authentication process predetermined by a service provider is performed, and the AAA 130 sends TCS 140 obtainable unique information such as unique information of the terminal 100, the unique information of the user of the terminal 100 and the information of the terminal the user is holding when the authentication is complete according to the predetermined procedures. The authenticated terminal can use an IP access service, and a first terminal available for the IP access service sends the status information regarding the current service and the terminal to the TCS 140. These procedures can be referred to as preparation for use of the service of each terminal. When the preparation for use of the service with respect to each terminal is complete, the unique information managing unit 142 of the TCS 140 stores and manages the unique information of the service and the user and the unique information of the terminal, and the status information managing unit 144 stores the status information of the service and the user and the terminal status information.

When the preparation for use of the service is complete for the first terminal (operation S10), the first terminal issues a service request to the CP 150 (operation S11) and the CP 150 provides the requested service to the first terminal (operation S12).

If the user needs to change the terminal for use of the service to a second terminal while using the service with the first terminal (operation S13), the user requests the TCS 140 for the terminal shift service (operation S14). A particular button or switch may preferably be used for this procedure to initiate a specific function to interrupt the operation of the terminal which is using the service.

The TCS 140 searches the unique information managing unit 142 makes a list of terminals that have been registered by the user and are available for the current IP service, and sends the list to the first terminal on the user side (operation S15). In response, the user chooses a terminal from the list and sends the result to the TCS 140 (operation S16). The TCS 140 sends the selected terminal a remote start message in accordance with the characteristics of the selected terminal (operation S17), and remotely starts the selected terminal, which is the second terminal in the current embodiment. Alternatively, the TCS 140 sends the user a starting guide message (operation S18) so that the user can start the desired terminal manually. However, when the terminal, which the service is to be shifted to, has been already turned on, the TCS 140 is aware of this situation, and thus the procedure will be omitted.

The preparation of use of the service is performed on the second terminal to which the service is to be shifted (operation S19). When the second terminal is ready for using the service, the TCS 140 sends a preparation completion message to the first terminal that requested the shift of service (operation S20). The first terminal that receives the message sends the status information of the current service and the terminal status information to the TCS 140 (operation S21). The status information to be sent may be a kind of the current service and the method of accessing to the service, cookie information including the service log-on information and temporary information generated in the course of using the service, and service usage information including the time when the service is used or the progress of the service. In addition, the terminal status information may be an IP address obtained by the terminal, information of the currently used communication network, resource usage information including the band and CPU occupancy rate.

The TCS 140 receives the status information as mentioned above, generates service session information regarding the current service for the second terminal to which the current service will be shifted, and sends the generated service session information along with a service starting request to the second terminal (operation S23). In response, the second terminal issues a service request to the CP 150 based on the service session information received from the TCS 140 (operation S24), and the CP 150 provides the corresponding service to the second terminal in response to the service request from the second terminal (operation S25).

Thus, according to the procedures described above, for example, when a user who is doing Internet shopping using a desktop personal computer (first terminal) at home wants to go out, the user can continue to browse the Internet outside the home using a laptop computer by changing the terminal to the laptop computer. For further information, the service provided to the first terminal can be stopped according to the type of the service of policies of the CP 150, and the stopping time point may vary according to the policies of the CP 150.

Figure 6:
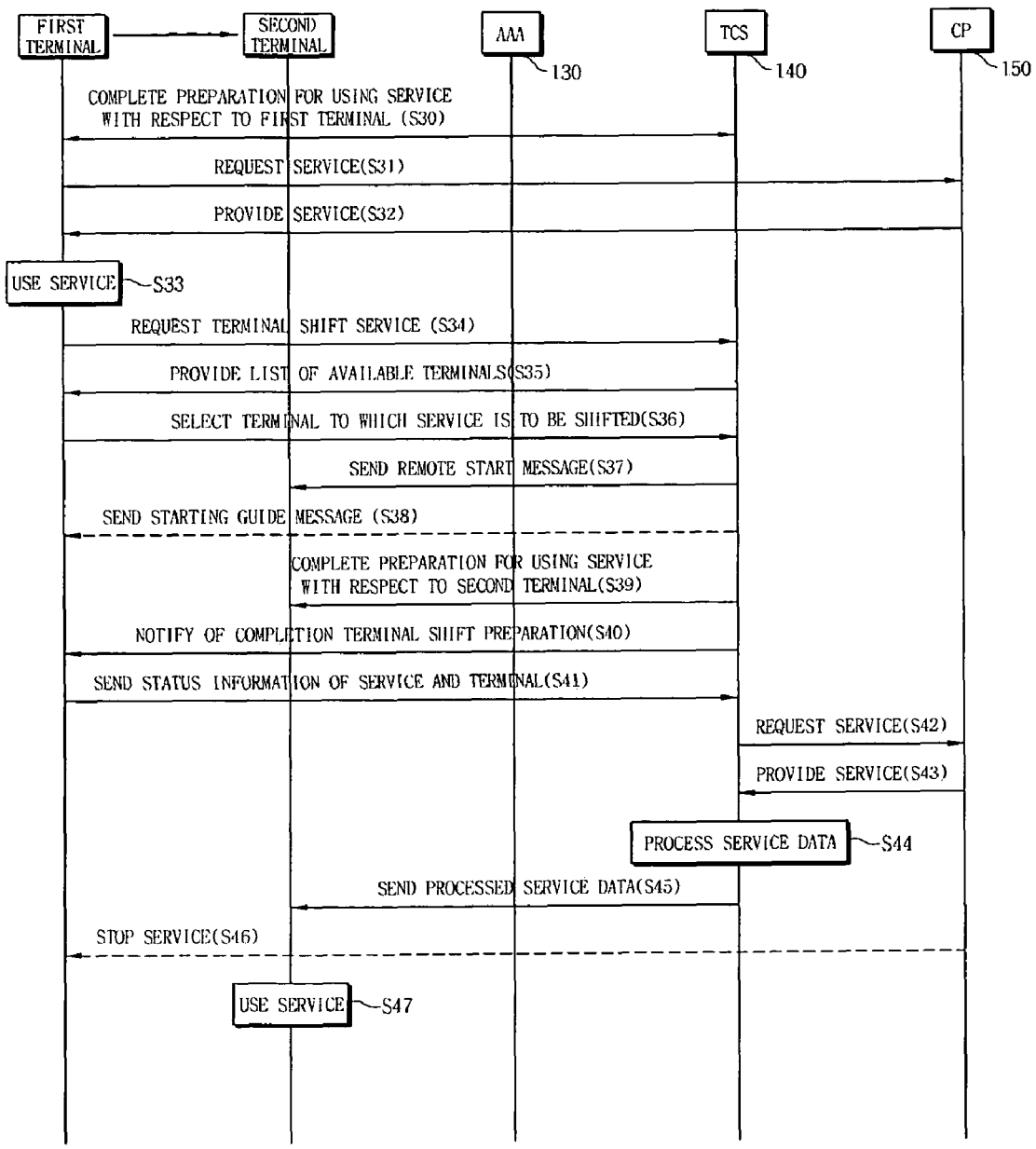
FIG. 6 is a flowchart illustrating how a terminal shift management service is provided according to an embodiment of the present invention.

FIG. 6 is a flowchart illustrating how a terminal shift management service is provided according to an embodiment of the present invention, and more particularly, how a proxy module 146 is utilized for the terminal shift management service. Most operations for the terminal shift management service in the current embodiment are similar to those for the terminal shift management service in FIG. 5. However, the proxy module 146 issues a service request directly to the CP 150, receives and processes the service data, and then sends the processed service data to the second terminal unlike in FIG. 5 in which the terminal to which the IP service will be shifted issues the service request to the CP 150.

Referring to FIG. 6, operations S30 through S41, in which the terminal currently using the service requests the service shift and sends current status information of the service and terminal to the TCS 140, are the same as operations S10 through S21 in FIG. 5, respectively, and thus the detailed description of these operations will be omitted.

If the first terminal which requested the CP 150 for the service shift sends the status information of the terminal and the service to the TCS 140 in operation S41, the proxy module 146 of the TCS 140 requests the CP 150 to send the service that the first terminal is currently using (operation S42). When the CP 150 sends the service data to the TCS 140 in response (operation S42), the proxy module 146 processes the corresponding service data in accordance with the status of the terminal to which the service will be shifted (operation S44). The service data may be processed to have its band or codec adjusted, or to have offset information applied thereto. The processed data service is sent to the second terminal to which the service data is to be shifted (operation S45).

According to the procedures described above, for example, a user who is using a video streaming service through a personal digital assistant (PDA) outside home can change the terminal to an IP TV at home to continue to use the video streaming service without disconnection.

According to the present invention as described above, a terminal-independent service providing system provides a terminal of the user with information about terminals available for the service when the user requests the system to change the terminal to a different terminal for the current service. Then, when the user selects a terminal based on the information about the available terminals, the system generates service session information required to provide the service to the selected terminal, so that the user can easily change the terminal to the selected terminal while using an IP service and can be provided with the IP service without disconnection.

Moreover, the present invention tends to encourage the user to use a terminal the most suitable for a current IP service from among terminals that the user has owned and registered, and thus the user can obtain more satisfaction regarding the use of the service.

Furthermore, since the present invention can be implemented by only adding a terminal-independent service providing system such as a terminal control server to a network and adjusting software of the existing terminal and an AAA authentication system, there is not much changes in the existing network when the present invention is applied, and thus there is an effect of establishing a new service network with a relatively low cost.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A terminal shift management system comprising:
    an authentication authorization accounting (AAA) interface unit which receives unique information having fixed properties with respect to a terminal authenticated by a subscriber terminal authentication system and a user of the authenticated terminal;
    a terminal interface unit which receives status information having variable properties with respect to the authorized terminal and a currently used service;
    a unique information managing unit which stores and manages the unique information;
    a status information managing unit which stores and manages the status information;
    a first terminal; and
    a terminal shift management control unit which
        receives a terminal shift request from the first terminal that currently receives the service,
        provides to the first terminal a list of terminals available for receiving the current service with reference to the unique information and the status information so that a user of the first terminal selects a second terminal from the list,
        receives information indicating that the second terminal is selected,
        generates service session information which is required to send the currently used service to the second terminal, and
        sends the generated service session information to the selected second terminal to which the service is to be shifted.

2. The terminal shift management system of claim 1, wherein the terminal shift management control unit sends a remote start message to the selected terminal to which the service is to be shifted in order to remotely control.

3. The terminal shift management system of claim 1, wherein the terminal shift management control unit which sends a starting guide message to the selected terminal to which the service is to be shifted.

4. The terminal shift management system of claim 1, wherein the unique information includes unique information of the authenticated terminal, unique information of a user of the authenticated terminal, and information of a terminal that the user has registered, and the status information includes status information of the currently used service and status information of the terminal that is using the service.

5. A terminal shift management system comprising:
    an AAA interface unit which receives unique information of terminals authenticated by a subscriber terminal authentication system, unique information of a user of the authenticated terminals, and unique information of terminals that the user has registered;
    a terminal interface unit which receives current terminal status information and service status information from the authenticated terminals;
    a unique information managing unit which stores and manages the unique information;
    a status information managing unit which stores and manages the status information;
    a first terminal;
    a terminal shift management control unit which
        receives a terminal shift request from the first terminal that currently uses the service,
        provides to the first terminal a list of terminals available for receiving the currently used service with reference to the unique information so that a user of the first terminal selects a second terminal from the list,
        receives information indicating that the second terminal is selected, and
        receiving information regarding the second terminal to which the service is to be shifted; and
    a service proxy module which requests a contents provider to send service data that is currently used by the first terminal that has issued the terminal shift request, receives the service data in response and processes the service data in accordance with specifications of the second terminal to which the service is to be shifted.

6. The terminal shift management system of claim 5, wherein the terminal shift management control unit sends a remote start message in order to remotely control the terminal to which the service is to be shifted.

7. The terminal shift management system of claim 5, wherein the terminal shift management control unit sends a starting guide message to the terminal to which the service is to be shifted.

8. A method of using a terminal shift management service, which is carried out by a first terminal having access to a terminal shift management system that provides a terminal shift management service, the method comprising:
    transmitting authentication information to a subscriber terminal authentication system;
    transmitting current status information of the terminal to the terminal shift management system, wherein the terminal shift management system receives unique information having fixed properties with respect to a terminal authenticated by the subscriber terminal authentication system and a user of the authenticated terminal, and status information having variable properties with respect to the authorized terminal and a currently used service, and stores and manages the unique information and the status information;
    issuing a service request to a contents provider server and receiving service data in response to the service request;
    requesting a terminal shift service to shift the currently used service to a second terminal, receiving a list of terminals to which the service can be shifted so that a user selects the second terminal from the list, sending the system information of the second terminal that the user selects from the list; and transmitting status information of the currently used service and terminal status information in response to a service preparation completion message, wherein the terminal shift management system communicates with the first terminal and second terminal to shift the currently used service from the first terminal to the second terminal based on the status information of the currently used service.

9. The method of claim 8, wherein the status information of the currently used service includes at least one of a type of the service, an access method, cookie information including service log-on information and temporary information generated in the course of using the service, and service usage information.

10. The method of claim 8, wherein the terminal status information includes at least one of an access network, access port information, a terminal address, a terminal resource availability, and information of effective band.

11. The method of claim 8, further comprising:
transmitting changed terminal status information to system each time the terminal status information is changed.

12. The method of claim 11, wherein the status information of the currently used service includes at least one of a type of the service, an access method, cookie information including service log-on information and temporary information generated in the course of using the service, and service usage information.

13. The method of claim 11, wherein the terminal status information includes at least one of an access network, access port information, a terminal address, a terminal resource availability, and information of effective band.

* * * * *